Sept. 29, 1953 H. D. YODER 2,653,479
LIQUID LEVEL GAUGE
Filed Oct. 18, 1948
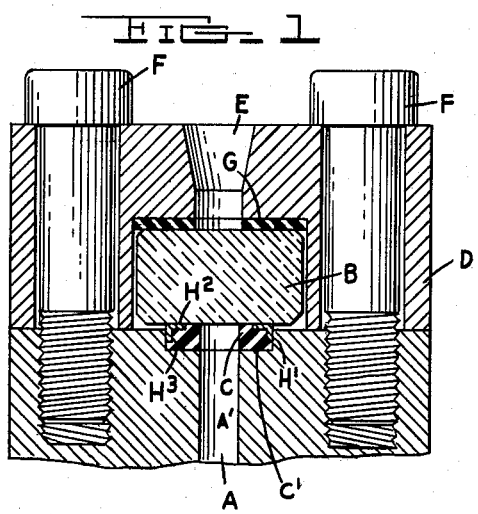
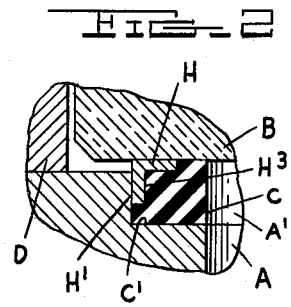
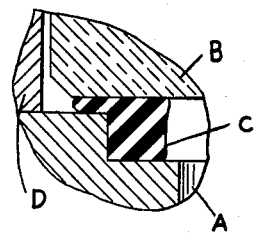
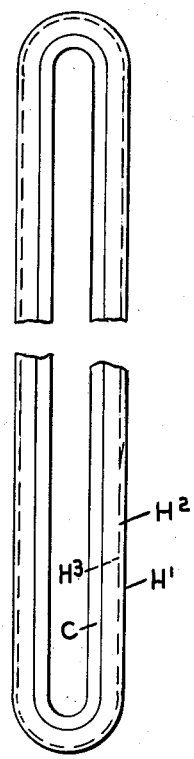
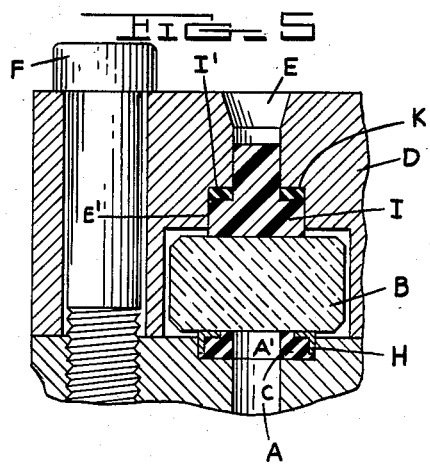
INVENTOR.
HOWARD D. YODER
BY
*Whittemore, Hulbert + Belknap*
ATTORNEYS Patented Sept. 29, 1953

2,653,479

UNITED STATES PATENT OFFICE 2,653,479

LIQUID LEVEL GAUGE

Howard D. Yoder, Detroit, Mich., assignor, by mesne assignments, to Buffalo-Eclipse Corporation, a corporation of New York Application October 18, 1948, Serial No. 55,207

4 Claims. (Cl. 73—330)

The invention relates to liquid level gauges of that type in which a front plate of glass or other transparent material is clamped to a channeled body containing the fluid under pressure.

It is the object of the invention to obtain a construction which will effectively seal the transparent plate to the body and will maintain such seal even where internal pressure is excessively high.

It is a further object to avoid any danger of overstressing the glass or transparent plate under any pressure to which it may be subjected.

With these objects in view the invention consists in the construction as hereinafter set forth.

In the drawings:

Figure 1 is a cross section through a liquid level gauge of my improved construction;

Figure 2 is an enlarged view of a portion of Figure 1;

Figure 3 is a diagrammatic cross section illustrating what might occur in a gauge not having my improved construction; and Figure 4 is a front elevation of the sealing gasket forming an essential element of my improved construction;

Figure 5 is a view similar to Fig. 1 showing a modified construction.

As illustrated in Figure 1, A is a channeled body member preferably of metallic construction. B is a transparent plate covering the opening of the channel. C is a gasket arranged between the plate B and the body A to surround the channel opening and preferably located in a recess C'. D is a cap or cover for clamping the plate B to the body, which cover is provided with an observation opening E in registration with the channel A' of the body. F are bolts for securing the member D to the body and G is a cushion or gasket member between the front surface of the member B and the overlapping portions of the cover D.

With the construction as thus far described the parts are so proportioned that when the cover D is secured to the body by the bolts F, the plate B will be pressed against the gasket C with sufficient pressure to form an initial seal. This pressure is transmitted to the member B from the cap D through the medium of the cushion G, which latter is sufficiently yielding to compensate for any irregularities in the surfaces between which it is placed. However, the pressure is limited so as to avoid any overstressing of the fragile glass B. When the gauge is in use and subjected to high internal fluid pressure, this pressure acting upon the inner surface of the gasket C will increase the outward pressure of said gasket against the member B and, as the cushion G is yielding, it will be further compressed by an outward movement of the member B. Thus the gasket C if formed of material of a sufficiently resilient and yielding character will be self sealing regardless of variations in pressure of the fluid within the body.

There is, however, one defect in the construction as thus far described which may result in failure. When internal fluid pressure is increased the plate B will be moved outward as above described and this will separate its lower surface from the top face of the body A. A crevice is thus formed and if the pressure against the gasket C is sufficiently high it may extrude the material of the gasket through this crevice (as illustrated in the diagram, Figure 3) thereby breaking the seal.

To overcome this defect, I have devised a construction which precludes any possibility of extruding the gasket whatever the internal pressure to which it is subjected. This means, as specifically illustrated, comprises a member H of rigid material which is fitted to the outer portion of the gasket to be movable therewith. The member H completely surrounds the gasket and is preferably of angle cross-section having a downwardly extending flange H' and an inwardly extending flange $H^2$. This member H may be formed of a metal stamping. Internal fluid pressure against the inner surface $H^3$ of the gasket may deform the same decreasing its width and increasing its height, but the member H will always remain between the gasket and any crevice or opening between the member B and the body A. This will effectively prevent extrusion of the material of the gasket through such crevice or opening.

While I have specifically shown the member H as of angle cross section, this may not be necessary as any means for preventing extrusion of the gasket material will accomplish the desired purpose.

The gasket C is what might be termed a constant volume type, being deformable under pressure but retaining a substantially constant volume. It also has the characteristics of a hydraulic fluid, so that pressure applied thereto will be distributed uniformly over a retaining surface. This is particularly desirable when used in connection with a fragile material such as glass. With my improved construction the deformable gasket is combined with a non-deformable retainer, which is mounted thereon to be movable therewith and will therefore close any opening developed by the deformation of the gasket.

In Figure 5 I have shown a modified construction where a constant volume gasket is used between the glass and the retaining cap. As shown the glass B has a member I of transparent material adjacent to its outer surface and which extends into the observation opening E' of the cap D. There is also a resilient gasket K in the recess E' between a shoulder I' on the member I and an opposed shoulder on the cap. With this construction the pressure against the outer surface of the glass is uniformly distributed which would not be the case if high internal resistance gasket material were used.

What I claim as my invention is:

1. In a gauge, a body having a channel opening through an outer face thereof and a recess in said body surrounding said channel, a transparent plate covering said channel and recess and overlapping the surrounding portion of said outer face, a self-sealing gasket of extrudable material within said recess, means secured to said body for pressing said plate against said gasket, and a non-extrudable retainer surrounding and carried by said gasket to be pressed thereby against said plate and to also extend into said recess closing any crevice between said plate and said face of the body.

2. The construction as in claim 1 including a cap surrounding said plate rigidly secured to said body and having a portion overlapping the marginal portion of said plate, said cap constituting the means for pressing said plate against said gasket.

3. The construction as in claim 2 provided with a cushioning gasket between said plate and the overlapping portion of said cap.

4. The construction as in claim 3 in which said non-extrudable retainer is of an angle cross-section having one leg thereof extending over a portion of said gasket adjacent to said plate and the other leg extending into said recess.

HOWARD D. YODER.

References Cited in the file of this patent

UNITED STATES PATENTS

| Number | Name | Date |
|---|---|---|
| 827,002 | Engler | July 24, 1906 |
| 2,109,355 | Lank | Feb. 22, 1938 |
| 2,201,542 | Kinderman | May 21, 1940 |
| 2,374,403 | Yarnall | Apr. 24, 1945 |

FOREIGN PATENTS

| Number | Country | Date |
|---|---|---|
| 35,697 | Austria | Aug. 1, 1908 |
| 257,414 | Germany | Jan. 24, 1912 |